United States Patent [19]
Fujimaki et al.

[11] Patent Number: 5,440,533
[45] Date of Patent: Aug. 8, 1995

[54] OPTICAL HEAD UNIT HAVING DISK-SHAPED ROTOR WITH GENERALLY PLANAR AND COMMON MOUNTING SURFACE FOR OPTICAL ELEMENTS

[75] Inventors: Tohru Fujimaki; Akio Futamata; Yasuyuki Ozawa, all of Kawasaki, Japan

[73] Assignee: Fujitsu Limited, Kawasaki, Japan

[21] Appl. No.: 320,378

[22] Filed: Oct. 11, 1994

Related U.S. Application Data

[63] Continuation of Ser. No. 65,023, May 24, 1993, abandoned, which is a continuation of Ser. No. 762,358, Sep. 19, 1991, abandoned.

[30] Foreign Application Priority Data

Sep. 19, 1990 [JP] Japan .................. 2-249358

[51] Int. Cl.$^6$ .............................................. G11B 7/12
[52] U.S. Cl. .................. 369/44.18; 369/44.19; 369/44.17; 369/44.14; 369/112; 359/814; 359/823
[58] Field of Search .............. 369/44.19, 44.14, 44.17, 369/44.18, 44.11, 112, 111, 44.34, 44.28, 44.32, 97; 355/813, 814, 823, 824

[56] References Cited

U.S. PATENT DOCUMENTS

| | | | |
|---|---|---|---|
| 4,807,213 | 2/1989 | Chung et al. ................. | 369/111 |
| 4,864,118 | 9/1989 | Opheij et al. ................ | 369/44.14 |
| 5,062,095 | 10/1991 | Korikawa et al. ............ | 369/44.14 |
| 5,239,528 | 8/1993 | Narahara et al. ............ | 369/44.34 |

FOREIGN PATENT DOCUMENTS

| | | | |
|---|---|---|---|
| 0074131 | 3/1983 | European Pat. Off. . | |
| 0203816 | 12/1986 | European Pat. Off. . | |
| 0339900 | 11/1989 | European Pat. Off. . | |
| 61-39939(A) | 2/1986 | Japan .................. | 369/44.14 |
| 61-261830 | 11/1986 | Japan . | |
| 61-276130 | 12/1986 | Japan . | |
| 62-154238(A) | 7/1987 | Japan .................. | 369/44.17 |
| 63-20732(A) | 1/1988 | Japan .................. | 369/44.19 |

OTHER PUBLICATIONS

Patent Abstracts of Japan, vol. 11, No. 116 (P-566) 11 Apr. 1987, & JP-A-61 261830 (Toshiba Corp.) 19 Nov. 1986.

Primary Examiner—Georgia Y. Epps
Assistant Examiner—Muhammad N. Edun
Attorney, Agent, or Firm—Staas & Halsey

[57] ABSTRACT

An optical head unit includes a motor having a stator and a rotor which is mounted rotatably on the stator, at least the rotor having a generally disk-shaped (i.e., circular or polygonal) configuration, and an optical system mounted on a common, main surface of the rotor. The optical system includes a light emitting part for emitting a light beam, a focus actuator, an objective lens provided on the focus actuator, and a light beam receiving part. The light beam emitted from the light emitting part is output via the objective lens, and light received via the objective lens is received by the light receiving part.

44 Claims, 9 Drawing Sheets

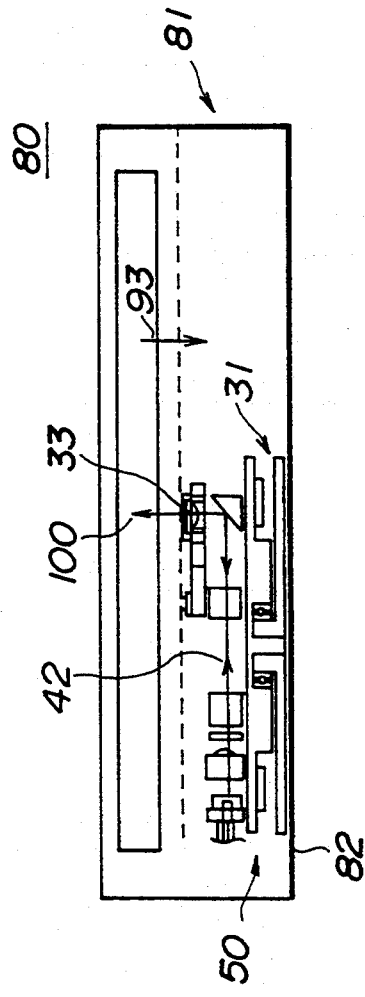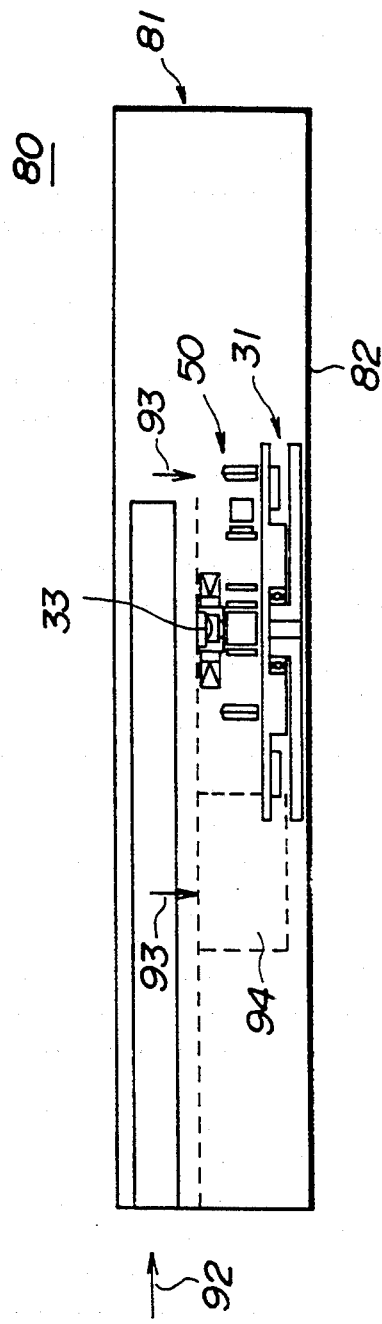

OPTICAL HEAD UNIT HAVING DISK-SHAPED ROTOR WITH GENERALLY PLANAR AND COMMON MOUNTING SURFACE FOR OPTICAL ELEMENTS

This application is a continuation of application Ser. No. 08/065,023, filed May 24, 1993, now abandoned, which is a continuation of application Ser. No. 07/762,358, filed Sep. 19, 1991, now abandoned.

BACKGROUND OF THE INVENTION

The present invention generally relates to optical head units, and more particularly to an optical head unit which is suited for use in an optical disk unit.

In optical disk units, there are demands to increase the access speed and to reduce the thickness of the optical disk unit. For this reason, it is desirable that the optical head unit have a structure which is unaffected by vibration and is suited for providing high-speed access to information stored in a disk. In addition, it is desirable that the optical head unit have a thin structure.

FIG. 1 shows a first example of a conventional optical head unit. An optical head unit 1 shown in FIG. 1 includes a light emitting part 2 and a light receiving part 3 which are fixedly provided on a substrate. An arm 8 has a built-in parallel prism 5, and an objective lens 6 and a focus actuator 7 are provided at a tip end of the arm 8. This arm 8 is rotated by a motor 4.

A laser beam 9 emitted from the light emitting part 2 is directed towards the parallel prism 5 by a mirror 10, as indicated by 9a. Access to a predetermined track on a magneto-optic disk 11 is made when the motor 4 is driven and the arm 8 is rotated by the motor 4.

On the other hand, FIG. 2 shows a second example of a conventional optical head unit. An optical head unit 20 as shown in FIG. 2 is disclosed in Japanese Laid-Open Patent Application No. 61-261830, for example.

In FIG. 2, an arm 23 is fixed on a shaft 22 of a motor 21. An objective lens 24, a focus actuator 25, a light emitting part 26 and a light receiving part 27 are built into the arm 23. Access to a predetermined track on a disk 28 is made when the motor 21 is driven and the arm 23 is rotated by the motor 21.

However, the conventional optical head units suffer from the following problems.

First, the arms 8 and 23 of the optical head units 1 and 20 both have a relatively long and narrow shape. For this reason, the arms 8 and 23 lack rigidity and easily vibrate, thereby making high-speed access difficult.

Second, it is difficult to make the optical head unit 1 thin because the laser beam 9 travels along a three-dimensional optical path.

Third, it is also difficult to make the optical head unit 20 thin because the arm 23 is fixed on the shaft 22 which projects upwardly from the motor 21.

SUMMARY OF THE INVENTION

Accordingly, it is a general object of the present invention to provide a novel and useful optical head unit in which the problems described above are eliminated.

Another and more specific object of the present invention is to provide an optical head unit comprising a motor including a stator and a rotor which is rotatably provided on the stator, in which at least the rotor has a generally circular or polygonal surface, and an optical system provided on the surface of the rotor of the motor. The optical system includes a light emitting part for emitting light, a focus actuator, an objective lens provided on the focus actuator, and a light receiving part; the light emitted from the light emitting part is output via the objective lens and light received via the objective lens is received by the light receiving part. According to the optical head unit of the present invention, it is possible to afford a high-speed access to an optical disk, and the optical head unit is strong against vibration even though the optical head unit has a thin structure.

Still another object of the present invention is to provide an optical head unit of the type described above wherein the objective lens and the focus actuator are provided along one diameter of the rotor on one side relative to a center of rotation of the rotor, and the light emitting part and the light receiving part are generally provided on the other side relative to the center of rotation of the rotor. According to the optical head unit of the present invention, the rotational balance of the rotor is extremely good.

A further object of the present invention is to provide an optical head unit of the type described above wherein the light emitted from the light emitting part travels approximately above the center of rotation of the rotor before reaching the objective lens. According to the optical head unit of the present invention, an optimum rotational balance of the rotor is realized.

Other objects and further features of the present invention will be apparent from the following detailed description when read in conjunction with the accompanying drawings.

BRIEF DESCRIPTION OF THE DRAWINGS

FIG. 11 is a front view of the magneto-optic disk unit shown in FIG. 10;

FIG. 12 is a side view of the magneto-optic disk unit shown in FIG. 10; and

DESCRIPTION OF THE PREFERRED EMBODIMENTS

Figure 1:
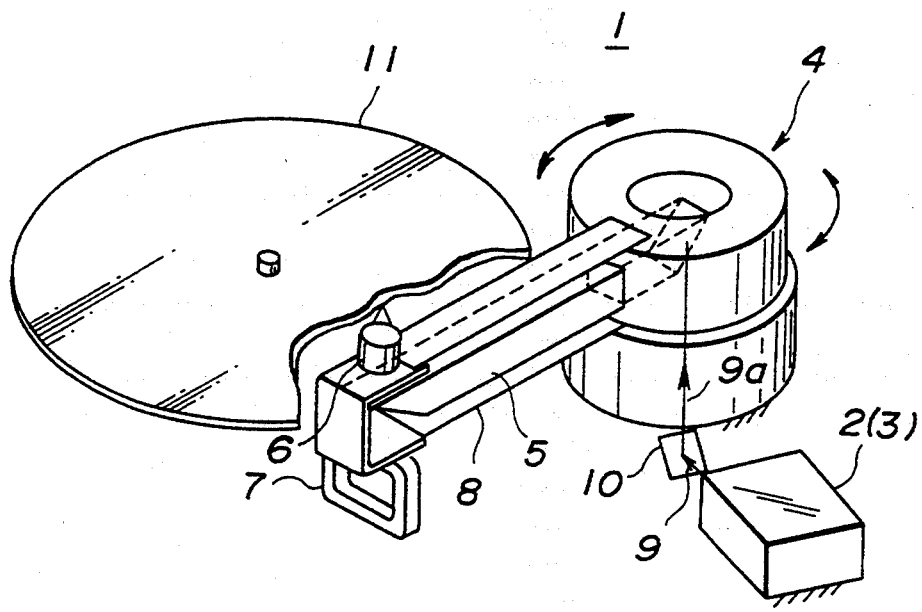
FIG. 1 is a perspective view of a first example of a conventional optical head unit.
Figure 2:
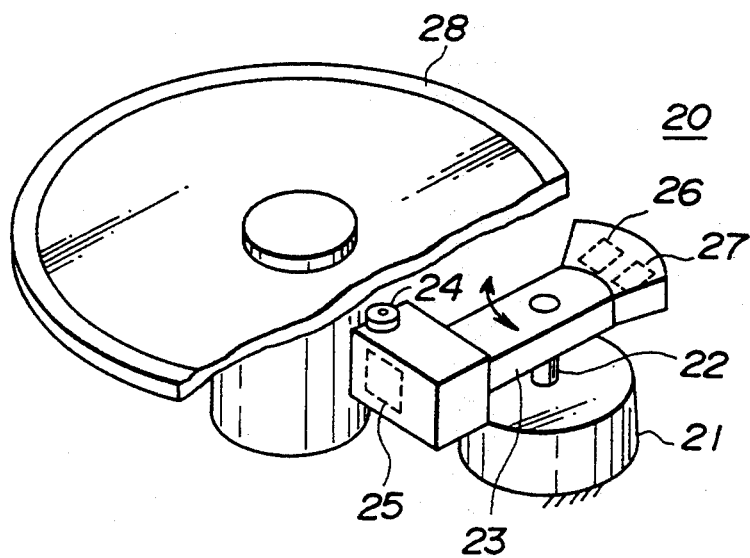
FIG. 2 is a perspective view of a second example of a conventional optical head unit.
Figure 3:
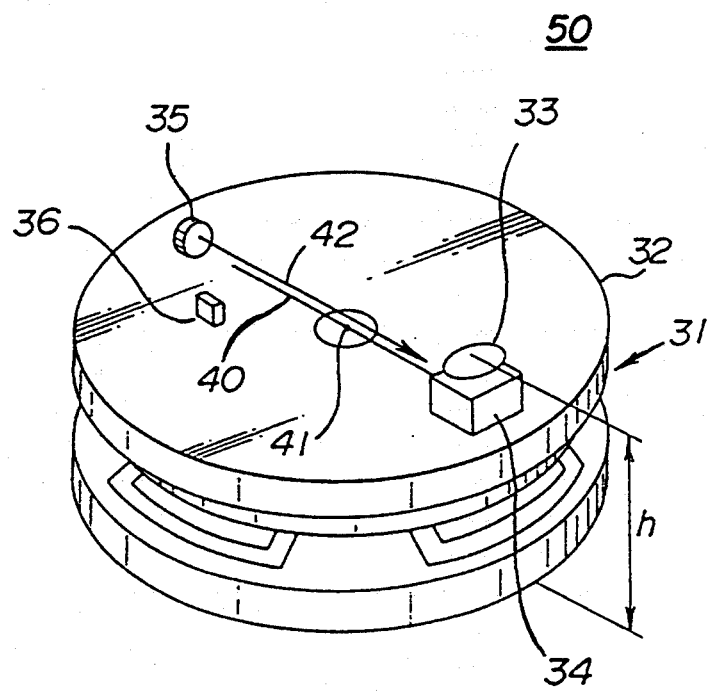
FIGS. 3, 4 and 5 respectively are a perspective view a cross sectional view and a plan view showing a first embodiment of an optical head unit according to the present invention.
Figure 4:
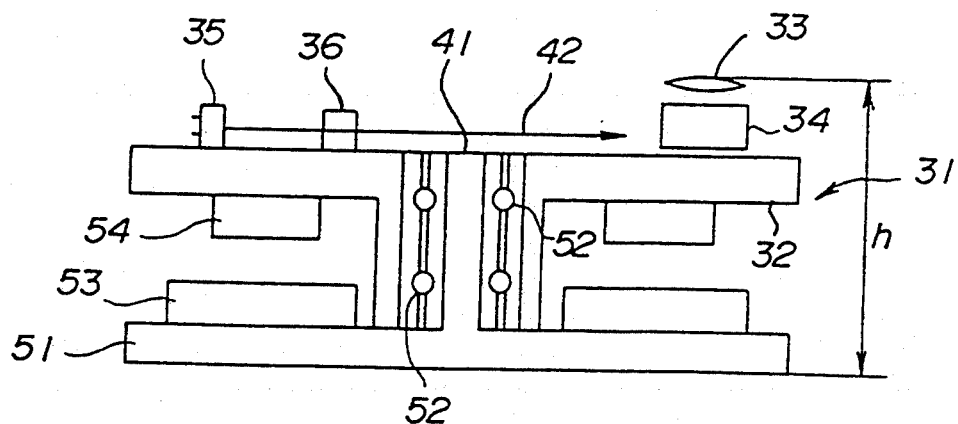
Figure 5:
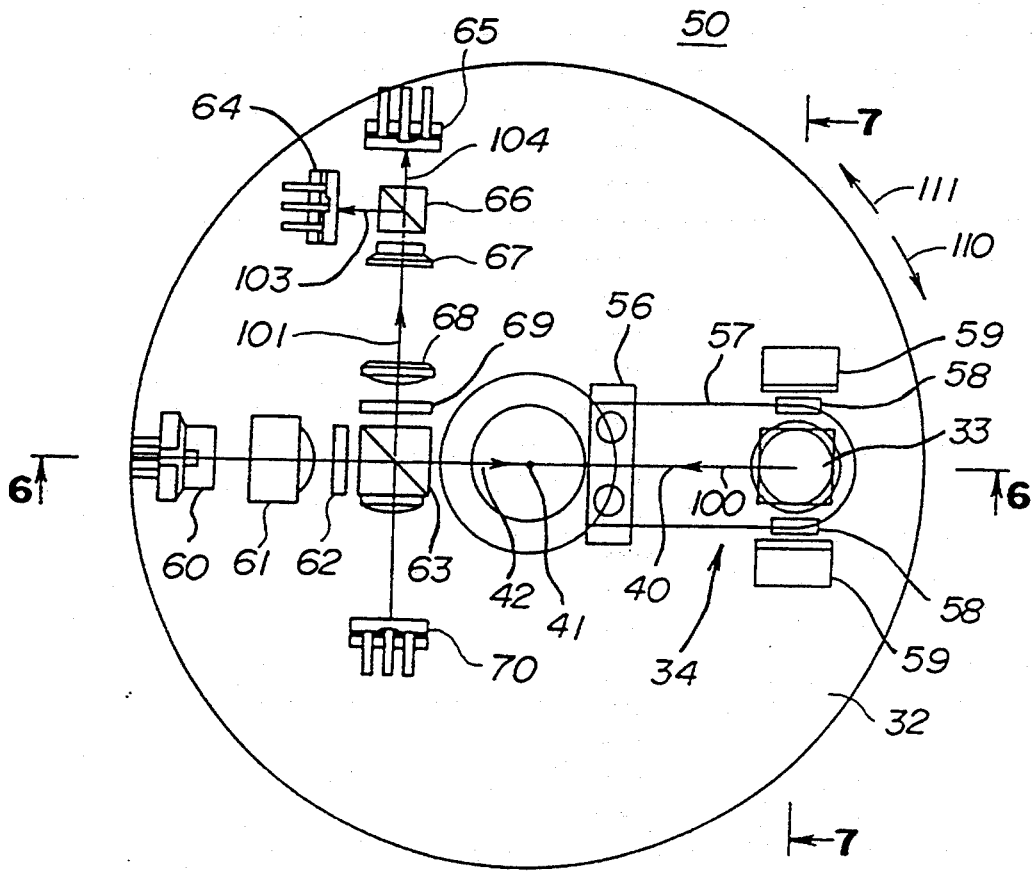
Figure 6:
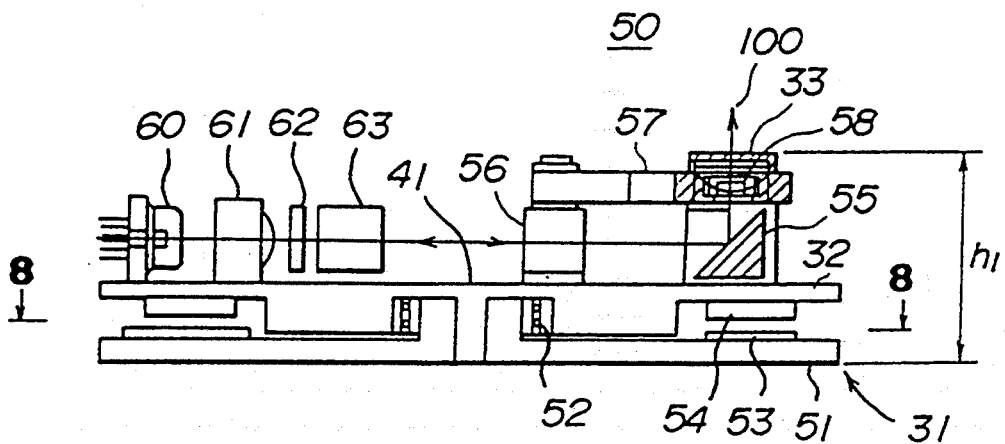
FIG. 6 is a cross sectional view taken along a line 6—6 in FIG. 5.
Figure 7:
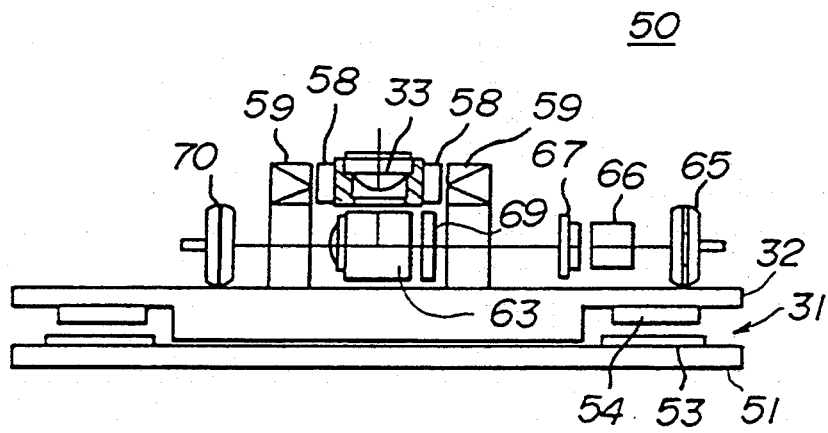
FIG. 7 is a cross sectional view taken along a line 7—7 in FIG. 5.
Figure 8:
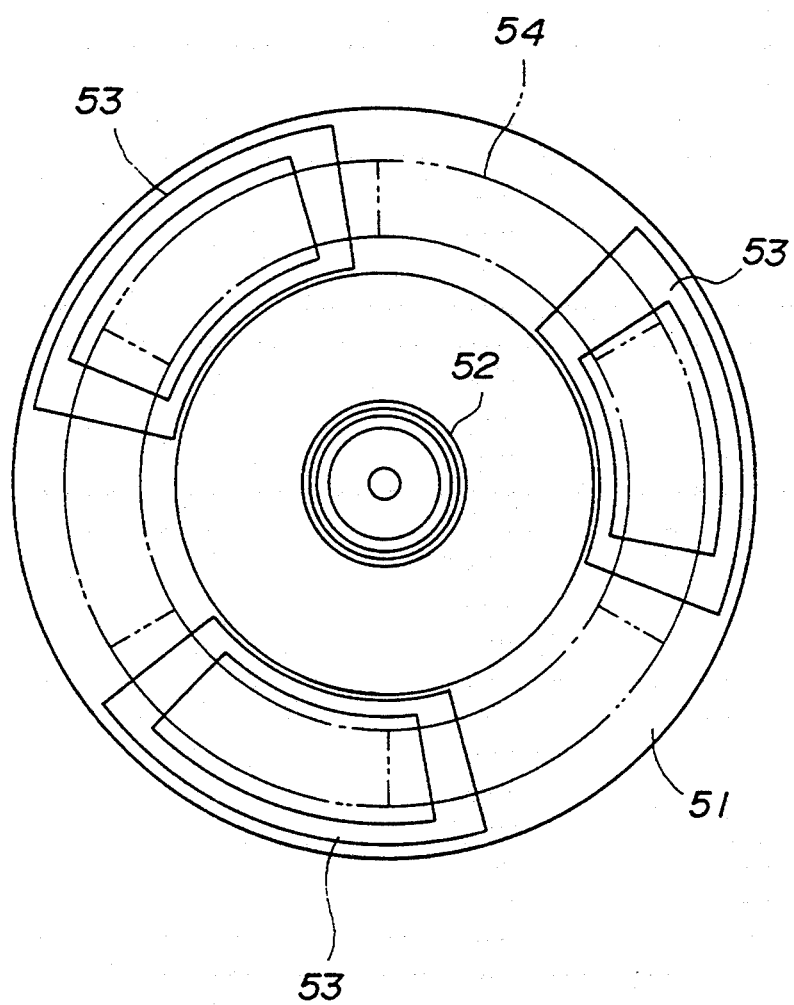
FIG. 8 is a cross sectional view taken along a line 8—8 in FIG. 6.

A description will be given of a first embodiment of an optical head unit according to the present invention. FIGS. 3, 4 and 5 respectively are a perspective view, a cross sectional view and a plan view of the first embodiment. FIG. 6 is a cross sectional view taken along a line 6—6 in FIG. 5, FIG. 7 is a cross sectional view taken along a line 7—7 in FIG. 5, and FIG. 8 is a cross section taken along a line 8—8 in FIG. 6.

Figure 9:
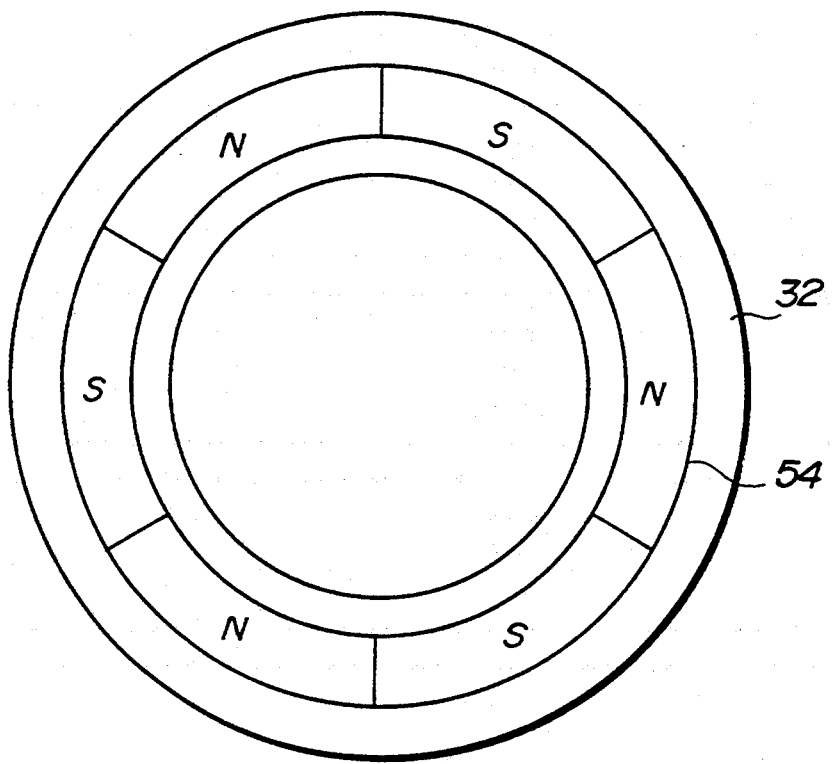
FIG. 9 is a bottom view showing a bottom of a rotor of the first embodiment.

In an optical head unit 50, a rotary voice coil motor 31 for tracking has a flat structure and includes a lower disk shaped stator 51 and an upper disk shaped rotor 32. The center of the rotor 32 is supported on bearings 52 so that the rotor 32 is rotatable with respect to the stator 51. The rotor 32 is arranged adjacent the stator 51. Flat driving coils 53 are adhered on the top surface of the stator 51, while a ring-shaped magnet 54 is fixed on the bottom surface of the rotor 32. The magnet 54 is magnetized in a peripheral direction. The driving coils 53 and the magnet 54 are also shown in FIG. 8 and FIG. 9 which show cross-sectional and bottom views respectively of the rotor 32. Three driving coils 53 are provided in this embodiment, but an odd number of driving coils 53, more than three, may be provided in correspondence with the number of S and N poles provided in the ring-shaped magnet 54.

Accordingly, the rotary voice coil motor 31 is a moving magnet type, and the focus actuator 34, the light emitting part 35 and the light receiving part 36 are virtually unaffected by undesirable effects of heat which is generated from the driving coils 53.

Parts forming an optical system are mounted on the upper surface of the rotor 32 in a predetermined arrangement.

As shown particularly in FIGS. 3, 5 and 6, an objective lens 33, a mirror 55 and a focus actuator 34 are provided on the rotor 32, generally aligned along the diameter 40, in a first direction relative to the center of rotation 41 of the rotor 32. The focus actuator 34 includes a base part 56 which is provided in the vicinity of the center of rotation 41, a leaf spring 57, driving coils 58 for focusing, and a magnetic circuit 59. A base part of the leaf spring 57 is fixed to the base part 56 and the leaf spring 57 extends along the diameter 40 toward the outer periphery of the rotor 32. The objective lens 33 is mounted on a tip end of the leaf spring 57. The driving coils 58 are respectively provided on the opposite sides of the tip end of the leaf spring 57. The magnetic circuit 59 is fixed on the rotor so as to confront (i.e., so as to be disposed in confronting relationship relatively to) the driving coils 58.

A semiconductor laser 60 comprising a light emitting part, a collimator lens 61, a diffraction grating 62 and a beam splitter 63 are provided and extending in a second direction, opposite to the above-noted first direction, relative to the center of rotation 41.

Photodiodes 64 and 65 which comprise a light receiving part, a polarization beam splitter 66, a cylindrical lens 67, a convex lens 68, a ½ wave plate 69 and a photodiode 70 are also provided on the rotor 32.

Because the rotary voice coil motor 31 of the optical head unit 50 has a flat structure and the parts of the optical system are fixed on the rotor 32 in a common plane, the height h1 of the optical head unit 50 shown in FIG. 6 is 15 mm or less.

Figure 10:
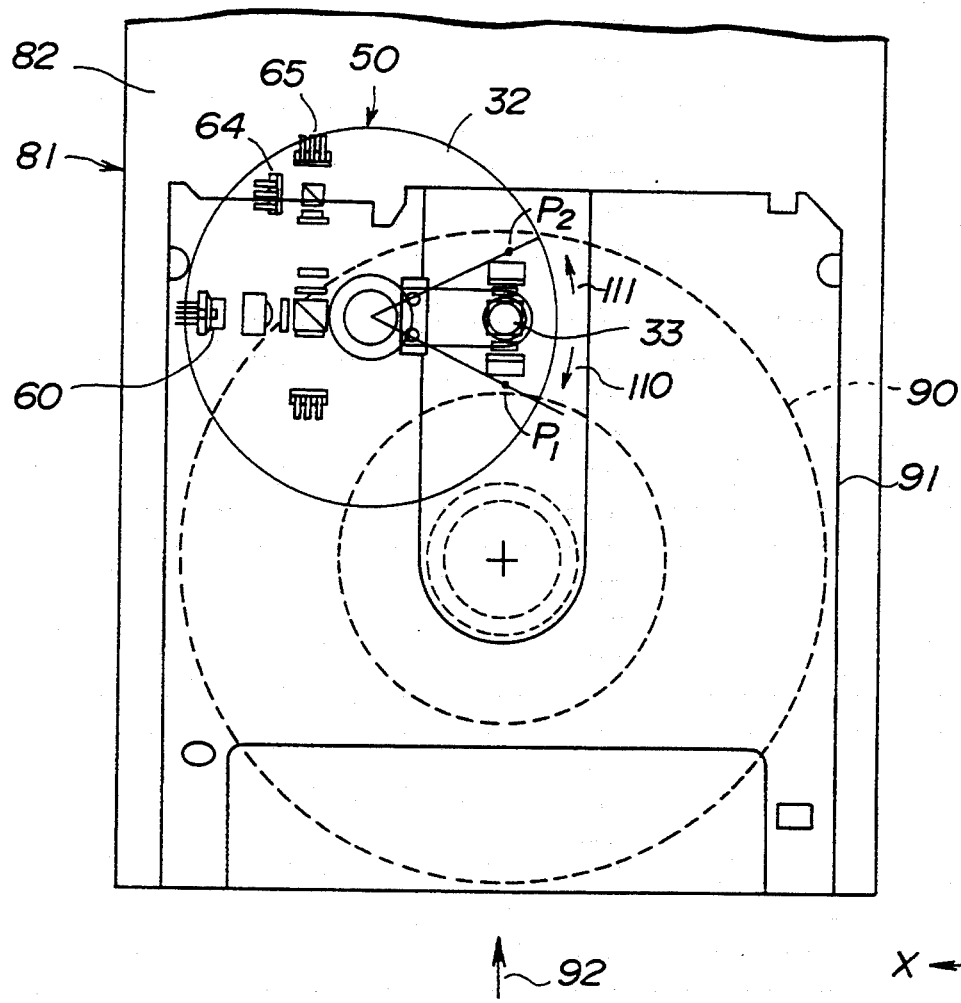
FIG. 10 is a plan view of a cartridge type magneto-optic disk unit employed with the first embodiment.

FIGS. 10, 11 and 12 respectively show a plan view, a front view and a side view of a 3.5-inch disk cartridge type magneto-optic disk unit 80 which is employed with the first embodiment, that is, the optical head unit 50. As shown in FIGS. 10 through 12, the stator 51 of the optical head unit 50 is fixed on a bottom plate 82 of a main body 81 of the magneto-optic disk unit 80. For example, the width of the magneto-optic disk unit 80 along the direction X in FIG. 10 is 101.6 mm, and the length of the magneto-optic disk unit 80 along the direction Y is 146 mm.

A disk cartridge 91 accommodates a 3.5-inch magneto-optic disk 90. This disk cartridge 91 is inserted into the magneto-optic disk unit 80 in a direction 92 shown in FIG. 10. The disk is lowered in a direction 93 shown in FIG. 11 so as to be placed on a disk motor 94. The optical head unit 50 is arranged at a position such that the objective lens 33 confronts the magneto-optic disk 90, which is exposed through a shutter (not shown) of the disk cartridge 91 and which shutter opens when the disk cartridge 91 is lowered and placed on the disk motor 94.

Next, a description will be given of the operation of the optical head unit 50. A laser beam 42 emitted from the semiconductor laser 60 travels by way of the collimator lens 61, the diffraction grating 62 and the beam splitter 63, and travels, through the axis of rotation and immediately above the center of rotation 41 until reaching the mirror 55. The mirror 55 directs the laser beam 100 to the objective lens 33, and the objective lens 33 converges the laser beam 100 on the magneto-optic disk 90. The laser beam 100, as output via the objective lens 33, is approximately perpendicular to the top surface of the rotor 32.

The laser beam 100, after being reflected from the magneto-optic disk 90, reaches the beam splitter 63 by way of the objective lens 33 and the mirror 55, and a predetermined component of the laser beam 100 is reflected. As last seen in FIG. 5, the reflected laser beam 101 from the beam splitter 63 passes through the ½ wave plate 69 so that the plane of polarization is rotated by 45°, and then reaches the polarization beam splitter 66 by way of the convex lens 68 and the cylindrical lens 67. Hence, the reflected laser beam 101 is polarized and split into two directions 103 and 104 thereby to be respectively received by the photodiodes 64 and 65. Outputs of the photodiodes 64 and 65 are differentially amplified so as to reproduce the information recorded on the magneto-optic disk 90.

The output of the semiconductor laser 60 is monitored by the photodiode 70.

To access the magneto-optic disk 90, a control current is applied to the driving coils 53 so as to drive the rotary voice coil motor 31. As a result, the rotor 32 rotates in a direction 110 or 111 shown in FIG. 5, and the objective lens 33 is moved between positions P1 and P2 in FIG. 10.

The rotor 32 is considerably rigid in the radial direction and throughout its surface to the periphery thereof. For this reason, even when the rotor 32 rotates at a high speed, the rotor 32 will not bend or vibrate. Therefore, the position of the objective lens 33 is accurately determined by the rotational position of the rotor 32, and it is unnecessary to provide an actuator for controlling the position of the objective lens 33 in the tracking direction.

In addition, the parts of the optical system are uniformly distributed on both sides of the rotor 32 relative to the center of rotation 41. Hence, the rotor 32 is evenly balanced in the radial direction of the rotor 32, thereby making it possible to smoothly rotate the rotor 32 at a high speed.

For the above described reasons, the access to the magneto-optic disk 90 can be made at a high speed using the optical head unit 50, when compared to the conventional optical head units.

On the other hand, the parts of the optical system are arranged so that the laser beam 42 emitted from the semiconductor laser 60 travels through the axis of rotation and immediately above the center of rotation 41 as shown in FIGS. 5 and 6, and FIGS. 11 and 12. In other words, in the plan view shown in FIG. 5, the laser beam 42 passes approximately through the axis of the center of rotation 41. Accordingly, the balance of the rotor 32 in the rotating direction is set to an optimum balance in this embodiment, thereby making it possible to more smoothly rotate the rotor 32 at thereby high speed and enable thereby high-speed access to the magneto-optic disk 90.

Figure 13:
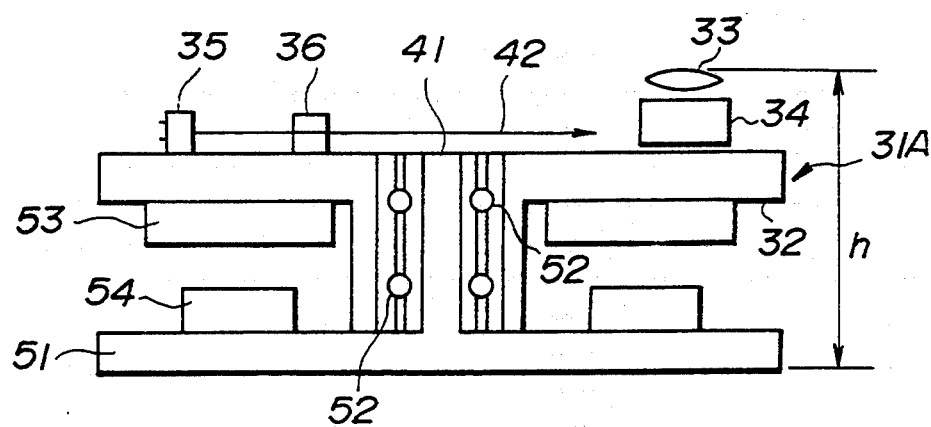
FIG. 13 is a cross sectional view of a second embodiment of the optical head unit according to the present invention.

Next, a description will be given of a second embodiment of the optical head unit according to the present invention, by referring to FIG. 13. FIG. 13 shows a cross section of the second embodiment. In FIG. 13, those parts which are the same as those corresponding parts in FIG. 4 are designated by the same reference numerals, and a description thereof will be omitted.

In an optical head unit 30A shown in FIG. 13, the flat driving coils 53 of a motor 31A are adhered to the bottom surface of the rotor 32, while the ring-shaped magnet 54 is fixed on the top surface of the stator 51. Otherwise, the structure of this embodiment is the same as that of the first embodiment described above.

In the disclosed embodiments, the present invention is employed with the magneto-optic disk unit 80 which operates with the magneto-optic disk 90. However, the present invention is applicable to any type of optical disk unit which operates with an optical disk.

In addition, the shape of the rotor 32 and the stator 51 is not limited to the disk or circular, shape as in the case of the disclosed embodiments. For example, the rotor 32 and/or each of the rotor and the stator 51 may have a polygonal shape or only a generally circular shape. Further, it is sufficient that at least the rotor 32 has the generally circular shape.

Moreover, the motor which is employed in the present invention is not limited to the rotary voice coil motor 31, and any flat type motor may be employed.

Preferably, the rotor 32 and the stator 51 are made of magnetizable materials so that the magnetic field is restricted to the vicinity of the rotary voice coil motor 31.

Further, the present invention is not limited to these embodiments, but various variations and modifications may be made without departing from the scope of the present invention.

What is claimed is:

1. An optical head unit comprising:
   a motor including a stator and a rotor, the rotor being rotatably mounted on the stator for rotation about an axis of rotation, relatively to the stator, and having a disk-shaped configuration of an outer periphery defined substantially as a circle coaxial with the axis of rotation and with a substantially planar first main surface transverse to the axis of rotation and a second main surface, the second main surface being disposed adjacent the stator and the first main surface being remote from the stator;
   an optical system defining an emitted light beam transmitting path and a reflected light beam receiving path and comprising a light beam emitting part for emitting a light beam, a focus actuator, an objective lens mounted on the focus actuator and a light beam receiving part commonly mounted on the first main surface of the rotor and disposed thereon so as to be contained within a boundary defined by the periphery of the rotor and relatively positioned, in accordance with the light beam transmitting and light beam receiving paths, such that the light beam emitted from the light beam emitting part is transmitted through the emitted light beam transmitting path to the objective lens and output thereby in a direction approximately perpendicular to the first main surface of the rotor and a reflected light beam, received by the objective lens likewise in the direction approximately perpendicular to the first main surface of the rotor, is output by the objective lens and transmitted through the reflected light beam receiving path to the light beam receiving part, the optical system further comprising means for directing the emitted light beam from the direction parallel, to the direction approximately perpendicular, to the first main surface of the rotor and for directing the received light beam from the direction approximately perpendicular, to the direction parallel, to the first main surface of the rotor; and
   means for receiving and positioning an optical disk such that the emitted light beam, as output by the objective lens, is converged onto the surface of the optical disk and reflected thereby, and the reflected light beam from the optical disk is received by the objective lens and transmitted thereby through the reflected light beam receiving path to the light beam receiving part.

2. An optical head unit as recited in claim 1, wherein at least respective portions of the emitted light beam transmitting path and the reflected light beam receiving path extend in respective, opposite directions along a common diameter of the rotor and thus substantially transversely to and passing through the axis of rotation of the rotor.

3. The optical head unit recited in claim 1, wherein the objective lens and the focus actuator are mounted at respective positions along a common diameter of the rotor and in a first direction relative to the axis of rotation of the rotor and the light emitting part and the light receiving part are mounted at respective positions along the common diameter of the rotor in a second direction, opposite to the first direction, relative to the axis of rotation of the rotor.

4. The optical head unit as recited in claim 3, wherein the light beam, as emitted by the light emitting part and as transmitted through the light transmitting path, passes substantially transversely to and through the axis of rotation of the rotor before reaching the objective lens.

5. The optical head unit as recited in claim 1, further comprising a beam splitter disposed in the received light beam transmitting path and between the light beam emitting part and the objective lens, the beam splitter directing the reflected light beam, as received and output by the objective lens, to the light beam receiving part.

6. The optical head unit as recited in claim 5, wherein said optical system further comprises a polarization beam splitter disposed in the received light beam transmitting path, between the beam splitter and the light receiving part, which splits the received light beam into, and outputs, a pair of received light beam components, and wherein said light beam receiving part further comprises a pair of light beam component receiving elements respectively receiving the pair of received light beam components output by the beam splitter.

7. The optical head unit as recited in claim 1, wherein each of the rotor and the stator are made of a magnetizable material.

8. The optical head unit as recited in claim 1, wherein the motor further comprises a ring-shaped magnet mounted on the second main surface of the rotor, disposed adjacent the stator, and N driving coils mounted on a main surface of the stator, adjacent the second main surface of the rotor and at positions at which the coils are in confronting relationship with respect to the ring-shaped magnet, wherein N is an arbitrary odd number greater than or equal to three and corresponds to the number of south and north poles of the ring-shaped magnet.

9. The optical head unit as recited in claim 1, wherein the motor comprises a ring-shaped magnet mounted on a main surface of the stator, adjacent the second main surface of the rotor, and N driving coils mounted on the second main surface of the rotor, disposed adjacent the stator, and at positions at which the coils are in confronting relationship with respect to the ring-shaped magnet, wherein N is an arbitrary odd number greater than or equal to three and corresponds to the number of south and north poles of the ring-shaped magnet.

10. The optical head unit as recited in claim 1, wherein the motor is a voice coil motor.

11. The optical head unit as recited in claim 10, wherein the stator has a generally disk shape.

12. An optical head unit as recited in claim 1, wherein the axis of rotation is vertically oriented and the first and second main surfaces of the rotor are respectively the top and bottom main surfaces of the rotor, extending transversely to the axis of rotation.

13. An optical head unit as recited in claim 1, wherein the rotor has a symmetrical configuration, relatively to the axis of rotation.

14. An optical head unit as recited in claim 1, wherein the rotor and the optical system, as mounted on the main surface of the rotor, are evenly weight-distributed relatively to the axis of rotation.

15. An optical head unit as recited in claim 1, wherein the stator comprises the yoke of the magnetic circuit.

16. An optical head unit as recited in claim 1, further comprising:
means for positioning the optical head unit relatively to the optical disk, the optical disk having a substantially planar surface and a central axis transverse to the planar surface thereof, with the axis of rotation of the rotor parallel to and displaced from the central axis of the disk and such that the rotation of the rotor about the axis of rotation thereof permits scanning the planar surface of the optical disk with the light beam emitted from the objective lens of the optical head unit.

17. An optical head unit as recited in claim 16, wherein the axis rotation of the rotor and the central axis of the disk are disposed in substantially parallel and displaced, vertical orientations.

18. An optical head unit comprising:
a motor including a stator and a rotor, the rotor being rotatably mounted on the stator for rotation about an axis of rotation relatively to the stator and having a configuration, in a plane transverse to the axis of rotation, which is symmetrical relatively to the axis of rotation and which has an outer periphery defined substantially as a circle, coaxial with the axis of rotation, and a substantially planar first main surface transverse to the axis of rotation and a second main surface, the second main surface being adjacent to and facing the stator and the first main surface being remote from the stator;

an optical system defining an emitted light beam transmitting path and a reflected light beam receiving path and comprising a light beam emitting part for emitting a light beam, a focus actuator, an objective lens mounted on the focus actuator and a light beam receiving part commonly mounted on the first main surface of the rotor and disposed thereon so as to be contained within a boundary defined by the periphery of the rotor and relatively positioned, in accordance with the light beam transmitting and light beam receiving paths, such that the light beam emitted from the light emitting part is transmitted through the emitted light beam transmitting path to the objective lens and output thereby in a direction approximately perpendicular to the first main surface of the rotor and a reflected light beam, received by the objective lens likewise in the direction approximately perpendicular to the first main surface of the rotor, is output by the objective lens and transmitted through the reflected light beam receiving path to the light beam receiving part, the optical system further comprising means for directing the emitted light beam from the direction parallel, to the direction approximately perpendicular, to the first main surface of the rotor and for directing the received light beam from the direction approximately perpendicular, to the direction parallel, to the first main surface of the rotor; and means for receiving and positioning an optical disk such that the emitted light beam, as output by the objective lens, is converged onto the surface of the optical disk and reflected by the optical disk and the reflected light beam from the optical disk is received by the objective lens and transmitted thereby through the reflected light beam receiving path to the light beam receiving part.

19. An optical head unit as recited in claim 18, wherein at least respective portions of the emitted light beam transmitting path and the reflected light beam receiving path extend in respective, opposite directions along a common diameter of the rotor and thus substantially transversely to and passing through the axis of rotation of the rotor.

20. An optical head unit as recited in claim 18, further comprising:
means for positioning the optical head unit relatively to the optical disk, the optical disk having a substantially planar surface and a central axis transverse to the planar surface thereof, with the axis of rotation of the rotor parallel to and displaced from the central axis of the disk and such that the rotation of the rotor about the axis of rotation thereof permits scanning the planar surface of the optical disk with the light beam emitted from the objective lens of the optical head unit.

21. An optical head unit as recited in claim 20, wherein the axis rotation of the rotor and the central axis of the disk are disposed in substantially parallel and displaced, vertical orientations.

22. An optical disk unit comprising:
a disk cartridge for receiving therein an opto-magnetic disk, the opto-magnetic disk having a substantially planar surface and a circular circumference and having a central axis transverse to the planar surface thereof;

an optical head unit comprising:

a motor including a stator and a rotor, the rotor being rotatably mounted on the stator for rotation about an axis of rotation relatively to the stator and having a disk-shaped configuration of a periphery, defined substantially as a circle coaxial with the axis of rotation and with a substantially planar first main surface transverse to the axis of rotation and a second main surface, the second main surface being disposed adjacent the stator and the first main surface being remote from the stator, and an optical system defining an emitted light beam transmitting path and a reflected light beam receiving path and comprising a light beam emitting part for emitting a light beam, a focus actuator, an objective lens mounted on the focus actuator and a light beam receiving part commonly mounted on the first main surface of the rotor and disposed thereon so as to be contained within a boundary defined by the periphery of the rotor and relatively positioned, in accordance with the light beam transmitting and light beam receiving paths, such that the light beam emitted from the light beam emitting part is transmitted through the emitted light beam transmitting path to the objective lens and output thereby in a direction approximately perpendicular to the first main surface of the rotor and a reflected light beam, received by the objective lens in a direction likewise approximately perpendicular to the first main surface of the rotor, is output by the objective lens and transmitted through the reflected light beam receiving path to the light beam receiving part; and means for mounting the optical head unit relatively to the optical disk unit such that the axis of rotation of the rotor is parallel to and spaced from the central axis of the opto-magnetic disk and the axis of rotation of the rotor and the central axis of the disk are disposed in substantially parallel and displaced, vertical orientations.

23. An optical head unit comprising:

a motor including a stator and a rotor, the rotor being rotatably mounted on the stator for rotation about an axis of rotation, relatively to the stator, and having a disk-shaped configuration and a periphery corresponding to the disk-shaped configuration, with a substantially planar first main surface transverse to the axis of rotation and a second main surface, the second main surface being disposed adjacent the stator and the first main surface being remote from the stator; and an optical system defining an emitted light beam transmitting path and a reflected light beam receiving path and comprising a light beam emitting part for emitting a light beam, a focus actuator, an objective lens mounted on the focus actuator and a light beam receiving part commonly mounted on the first main surface of the rotor and disposed thereon so as to be contained within a boundary defined by the periphery of the rotor and relatively positioned, in accordance with the light beam transmitting and light beam receiving paths, such that the light beam emitted from the light beam emitting part is transmitted through the emitted light beam transmitting path to the objective lens and output thereby and a reflected light beam, received by the objective lens, is output by the objective lens and transmitted through the reflected light beam receiving path to the light beam receiving part.

24. An optical head unit as recited in claim 23, wherein at least respective portions of the emitted light beam transmitting path and the reflected light beam receiving path extend in respective, opposite directions along a common diameter of the rotor and thus substantially transversely to and passing through the axis of rotation of the rotor.

25. The optical head unit recited in claim 23, wherein the objective lens and the focus actuator are mounted at respective positions along a common diameter of the rotor and in a first direction relative to the axis of rotation of the rotor and the light emitting part and the light receiving part are mounted at respective positions along the common diameter of the rotor in a second direction, opposite to the first direction, relative to the axis of rotation of the rotor.

26. The optical head unit as recited in claim 25, wherein the light beam, as emitted by the light emitting part and as transmitted through the light transmitting path, passes substantially transversely to and through the axis of rotation of the rotor before reaching the objective lens.

27. The optical head unit as recited in claim 23, further comprising a beam splitter disposed in the received light beam transmitting path and between the light beam emitting part and the objective lens, the beam splitter directing the reflected light beam, as received and output by the objective lens, to the light beam receiving part.

28. The optical head unit as recited in claim 27, wherein said optical system further comprises a polarization beam splitter disposed in the received light beam transmitting path, between the beam splitter and the light receiving part, which splits the received light beam into, and outputs, a pair of received light beam components, and wherein said light beam receiving part further comprises a pair of light beam component receiving elements respectively receiving the pair of received light beam components output by the beam splitter.

29. The optical head unit as recited in claim 23, wherein each of the rotor and the stator are made of a magnetizable material.

30. The optical head unit as recited in claim 23, wherein the motor further comprises a ring-shaped magnet mounted on the second main surface of the rotor, disposed adjacent the stator, and N driving coils mounted on a main surface of the stator, adjacent the second main surface of the rotor and at positions at which the coils are in confronting relationship with respect to the ring-shaped magnet, wherein N is an arbitrary odd number greater than or equal to three and corresponds to the number of south and north poles of the ring-shaped magnet.

31. The optical head unit as recited in claim 23, wherein the motor comprises a ring-shaped magnet mounted on a main surface of the stator, adjacent the second main surface of the rotor, and N driving coils mounted on the second main surface of the rotor, disposed adjacent the stator, and at positions at which the coils are in confronting relationship with respect to the ring-shaped magnet, wherein N is an arbitrary odd number greater than or equal to three and corresponds to the number of south and north poles of the ring-shaped magnet.

32. The optical head unit as recited in claim 23, wherein the motor is a voice coil motor.

33. The optical head unit as recited in claim 32, wherein the stator has a generally disk shape.

34. An optical head unit as recited in claim 23, wherein the axis of rotation is vertically oriented and the first and second main surfaces of the rotor are respectively the top and bottom main surfaces of the rotor, extending transversely to the axis of rotation.

35. An optical head unit as recited in claim 23, wherein the rotor has a symmetrical configuration, relatively to the axis of rotation.

36. An optical head unit as recited in claim 23, wherein the rotor and the optical system, as mounted on the main surface of the rotor, are evenly weight-distributed relatively to the axis of rotation.

37. An optical head unit as recited in claim 23, wherein the stator comprises the yoke of the magnetic circuit.

38. An optical head unit as recited in claim 23, further comprising:
means for positioning the optical head unit relatively to a magneto-optic disk, the disk having a substantially planar surface and a central axis transverse to the planar surface thereof, with the axis of rotation of the rotor parallel to and displaced from the central axis of the disk and such that the rotation of the rotor about the axis of rotation thereof permits scanning the planar surface of the disk with the light beam emitted from the objective lens of the optical head unit.

39. An optical head unit as recited in claim 38, wherein the axis rotation of the rotor and the central axis of the disk are disposed in substantially parallel and displaced, vertical orientations.

40. An optical head unit comprising:
a motor including a stator and a rotor, the rotor being rotatably mounted on the stator for rotation about an axis of rotation relatively to the stator and having a configuration, in a plane transverse to the axis of rotation, which is symmetrical relatively to the axis of rotation and a periphery corresponding to the configuration, and further having a substantially planar first main surface transverse to the axis of rotation and a second main surface, the second main surface being adjacent to and facing the stator and the first main surface being remote from the stator; and
an optical system defining an emitted light beam transmitting path and a reflected light beam receiving path and comprising a light beam emitting part for emitting a light beam, a focus actuator, an objective lens mounted on the focus actuator and a light beam receiving part commonly mounted on the first main surface of the rotor and disposed thereon so as to be contained within a boundary defined by the periphery of the rotor and relatively positioned, in accordance with the light beam transmitting and light beam receiving paths, such that the light beam emitted from the light beam emitting part is transmitted through the emitted light beam transmitting path to the objective lens and output thereby and a reflected light beam, received by the objective lens, is output by the objective lens and transmitted through the reflected light beam receiving path to the light beam receiving part.

41. An optical head unit as recited in claim 40, wherein at least respective portions of the emitted light beam transmitting path and the reflected light beam receiving path extend in respective, opposite directions along a common diameter of the rotor and thus substantially transversely to and passing through the axis of rotation of the rotor.

42. An optical head unit as recited in claim 40, further comprising:
means for positioning the optical head unit relatively to a magneto-optic disk, the disk having a substantially planar surface and a central axis transverse to the planar surface thereof, with the axis of rotation of the rotor parallel to and displaced from the central axis of the disk and such that the rotation of the rotor about the axis of rotation thereof permits scanning the planar surface of the disk with the light beam emitted from the objective lens of the optical head unit.

43. An optical head unit as recited in claim 42, wherein the axis rotation of the rotor and the central axis of the disk are disposed in substantially parallel and displaced, vertical orientations.

44. An optical disk unit comprising:
a disk cartridge for receiving therein an opto-magnetic disk, the opto-magnetic disk having a substantially planar surface and a circular circumference and having a central axis transverse to the planar surface thereof;
an optical head unit comprising:
a motor including a stator and a rotor, the rotor being rotatably mounted on the stator for rotation about an axis of rotation relatively to the stator and having a disk-shaped configuration and a periphery corresponding to the disk-shaped configuration, with a substantially planar first main surface transverse to the axis of rotation and a second main surface, the second main surface being disposed adjacent the stator and the first main surface being remote from the stator, and
an optical system defining an emitted light beam transmitting path and a reflected light beam receiving path and comprising a light beam emitting part for emitting a light beam, a focus actuator, an objective lens mounted on the focus actuator and a light beam receiving part commonly mounted on the first main surface of the rotor and disposed thereon so as to be contained within a boundary defined by the periphery of the rotor and relatively positioned, in accordance with the light beam transmitting and light beam receiving paths, such that the light beam emitted from the light beam emitting part is transmitted through the emitted light beam transmitting path to the objective lens and output thereby, and a reflected light beam, when received by the objective lens, is output by the objective lens and transmitted through the reflected light beam receiving path to the light beam receiving part; and
means for mounting the optical head unit relatively to the optical disk unit such that the axis of rotation of the rotor is parallel to and spaced from the central axis of the opto-magnetic disk and the axis of rotation of the rotor and the central axis of the disk are disposed in substantially parallel and displaced, vertical orientations.

* * * * *

UNITED STATES PATENT AND TRADEMARK OFFICE
CERTIFICATE OF CORRECTION

PATENT NO. : 5,440,533
DATED : Aug. 8, 1995
INVENTOR(S) : FUJIMAKI et al.

It is certified that error appears in the above-indentified patent and that said Letters Patent is hereby corrected as shown below:

Col. 3, line 48, after "provided" insert --on the rotor 32, generally aligned along the diameter 40--.

Col. 5, line 11, delete "thereby";
line 12, change "enable thereby" to --thereby enable--.

Col. 7 line 41, change "Surface" to --surface--.

Signed and Sealed this

Twenty-eighth Day of November 1995

Attest:

BRUCE LEHMAN

Attesting Officer    Commissioner of Patents and Trademarks